(12) United States Patent
Sundararajan et al.

(10) Patent No.: US 8,632,121 B1
(45) Date of Patent: Jan. 21, 2014

(54) POLE IMPACT PROTECTION SYSTEM

(71) Applicant: Ford Global Technologies, LLC, Dearborn, MI (US)

(72) Inventors: Srinivasan Sundararajan, Ann Arbor, MI (US); Mohammed Omar Faruque, Ann Arbor, MI (US); Fubang Wu, Troy, MI (US); Leonard Anthony Shaner, New Baltimore, MI (US); Michael M. Azzouz, Livonia, MI (US); David Anthony Wagner, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/676,454

(22) Filed: Nov. 14, 2012

(51) Int. Cl.
*B60R 21/00* (2006.01)
(52) U.S. Cl.
USPC .................. 296/187.08; 296/187.12
(58) Field of Classification Search
USPC ............. 296/68.1, 187.03, 187.05, 187.08, 296/187.12, 193.02, 193.07; 280/748
See application file for complete search history.

(56) References Cited

U.S. PATENT DOCUMENTS

| | | | | |
|---|---|---|---|---|
| 5,921,618 A * | 7/1999 | Mori et al. | ............... | 296/187.12 |
| 5,954,390 A * | 9/1999 | Kleinhoffer et al. | ...... | 296/203.01 |
| 6,434,907 B1 * | 8/2002 | Simboli | ..................... | 296/146.6 |
| 6,857,692 B2 | 2/2005 | Cardimen | | |
| 6,926,352 B2 * | 8/2005 | Gotou et al. | ................... | 296/204 |
| 7,216,924 B2 | 5/2007 | Li | | |
| 7,331,611 B2 | 2/2008 | Kusu | | |
| 7,393,016 B2 * | 7/2008 | Mitsui et al. | .................. | 280/784 |
| 7,500,714 B2 * | 3/2009 | Abe et al. | ................. | 296/193.07 |
| 7,578,545 B2 * | 8/2009 | Fujikawa | ................. | 296/187.09 |
| 7,631,926 B2 | 12/2009 | Fonseka | | |
| 7,753,437 B2 | 7/2010 | Klimek | | |
| 7,963,588 B2 * | 6/2011 | Kanagai et al. | .......... | 296/187.12 |
| 8,007,032 B1 | 8/2011 | Craig | | |
| 8,079,635 B2 * | 12/2011 | DeVor et al. | ............. | 296/187.08 |
| 2003/0090127 A1 * | 5/2003 | Saeki | ............................ | 296/188 |
| 2009/0146457 A1 * | 6/2009 | Kanagai et al. | .......... | 296/187.12 |
| 2010/0295335 A1 | 11/2010 | Devor | | |

OTHER PUBLICATIONS

Seat Crossmember of Tailored Strips, Author: NA http://incar.thyssenkrupp.com/4_02_044_QT02_Strukturmechanik.html?lang=en.
What are Side Impact Protection Features in Cars?, Author: NA http://www.ehow.com/info_8197316_side-impact-protection-features-cars.html.
Side Impact-Intrusion, Author: NA http://www.autosafetyexpert.com/defect_sideimpact.php.

* cited by examiner

*Primary Examiner* — Lori Lyjak
(74) *Attorney, Agent, or Firm* — L.C. Begin & Associates, PLLC (57) ABSTRACT

Pole impact protection systems for body-on-frame vehicles are presented that include first and second longitudinal frame members that are laterally connected by a tubular or non-tubular rigid and unbendable cross-member support. Upon impact on either side of an associated vehicle, the collision or impact energy is readily transferred to the opposite side of the vehicle thereby minimizing the damage to the passenger or occupant space within the vehicle.

20 Claims, 6 Drawing Sheets

POLE IMPACT PROTECTION SYSTEM

BACKGROUND OF THE INVENTION

It is an ongoing challenge to enhance the safety of vehicles with regard to minimizing the potential for injuries of occupants upon a collision event. A typical solution is to increase the metal girth or structure surrounding the passenger compartment. However, increasing the metal structure necessarily increases the weight, and therefore is detrimental when optimizing fuel efficiency.

The National Highway Traffic Safety Association (NHTSA) presides over several federal regulations that have been promulgated in the interest of passenger safety. Federal Motor Vehicle Safety Standard 214 (FMVSS 214) is particularly concerned with side pole impact protection requirements and mandates certain requirements for passenger safety in the event of a side collision with a pole or other stationary object.

Unitary frame/body assemblies inherently exhibit greater protection due to their design. When considering side pole impacts, body-on-frame vehicles, typically used in commercial vehicles such as buses and trucks, and also when employing tow packages in pick-up trucks for example, may not have the inherent strength of a monolithic unitary frame/body vehicle. As such, the body-on-frame structural integrity must be enhanced. Satisfying the requirements of FMVSS-214 when utilizing a body-on-frame vehicle therefore presents special challenges.

Accordingly, it would be an improvement to provide a relatively-low weight solution for strengthening body-on-frame vehicles in the event of a side pole impact or collision, thereby reconciling the need for enhanced occupant protection in the event of side pole impact with the need for optimum fuel efficiency.

SUMMARY OF THE PRESENT INVENTION

To reconcile the aforementioned concerns, a pole impact protection system for a body-on-frame vehicle is provided. A body-on-frame vehicle contains a body resting and fixed upon a lower frame, in a known manner. A frame contains a first longitudinal frame member and a second longitudinal frame member, each extending along the length of the vehicle and generally or at least approximately parallel to a longitudinal axis of the vehicle. A cross-member support laterally connects the first and second longitudinal members, the cross-member support containing a periphery defining a cross-section. The cross-member support may be tubular in nature thereby reducing the weight of the pole impact protection system.

In one embodiment of the impact protection system, a first laterally-outward connection region may be defined by an outer junction of the first longitudinal member and the cross member support extending therethrough, wherein the first connection region is fixed to at least a portion of the periphery. A second laterally-outward connection region may be defined by an outer junction of the second longitudinal member and the cross member support extending therethrough, wherein the second connection region is fixed to at least a portion of the periphery. If desired, a third laterally-inward connection region defined by an inner junction of the first longitudinal member and the cross member support extending therethrough, wherein the third connection region is fixed to at least portion of the periphery. Additionally, if desired, a fourth laterally-inward connection region defined by an inner junction of the second longitudinal member and the cross member support extending therethrough, wherein the fourth connection region is fixed to at least a portion of the periphery.

In a second embodiment, the impact protection system contains the same constituents as described above with the exception that the cross-member support tube is fastened to the first and second longitudinal members by bolting or fastening a first radially inner plate of the rigid cross member support to the first longitudinal member, and by bolting or fastening a second radially inner plate of the rigid cross member support to the second longitudinal member.

DETAILED DESCRIPTION OF THE INVENTION

In accordance with the present invention, a pole impact protection system is provided within a body-on-frame vehicle. A vehicle such as a truck or pick-up truck oftentimes contains a body attached to a separate frame. This is typically the case, for example, when the respective vehicle is also equipped with a towing package that is optimally contained within a body-on-frame vehicle. As will be appreciated, the frame is thereby better suited to contain the towing package thereby minimizing the attendant stresses that might otherwise be absorbed by the body, within a unitary or monolithic body-frame configuration for example.

Figure 1:
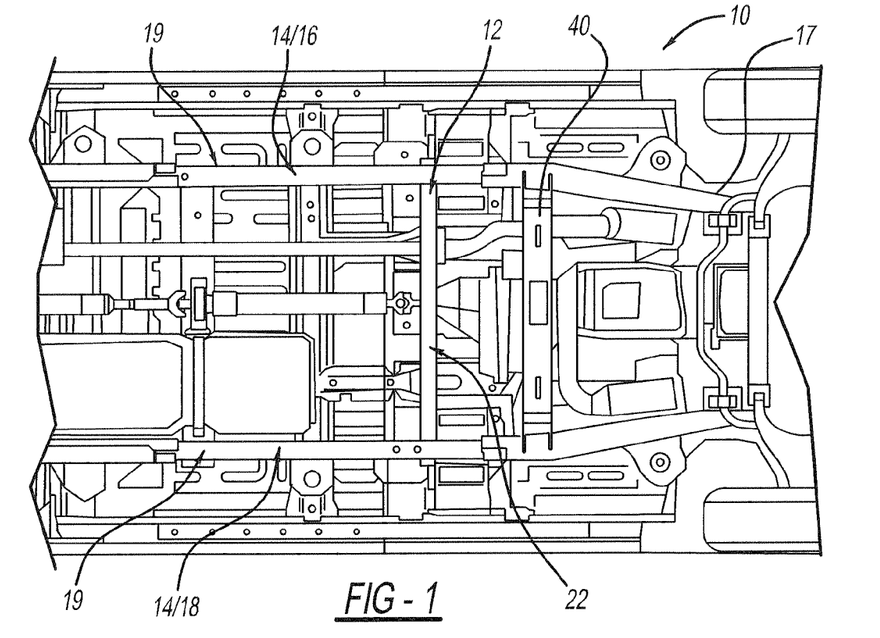
FIG. 1 is a bottom view of the frame and cross member support of the present invention, as it is fixed beneath the vehicle.
Figure 2:
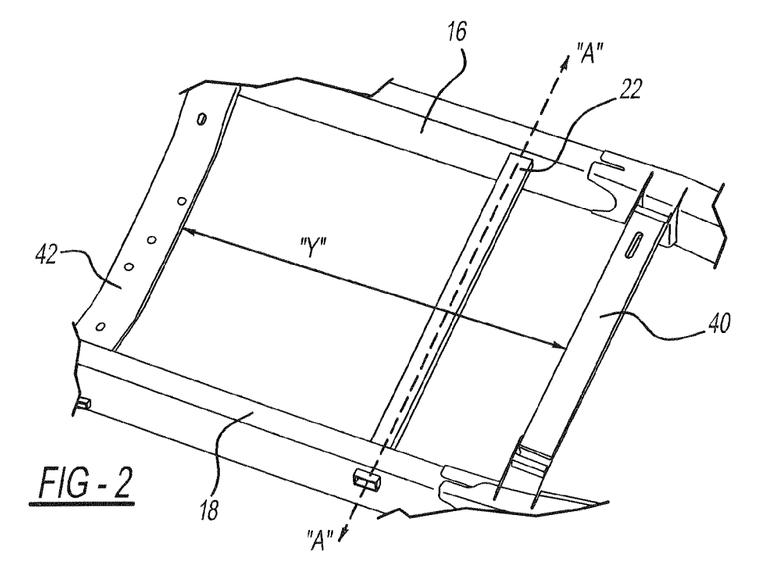
FIG. 2 is a perspective view of a pole impact protection system, in accordance with the present invention.

Referring to FIGS. 1 and 2, a vehicle 10 incorporating the present pole impact protection system 12 is shown. A frame 14 contains a left or first longitudinal frame member 16 and a right or second longitudinal frame member 18, for support of a body 20. The frame 14 has a length defined by a forward lateral position 17 proximate a front of the vehicle and an aft lateral position 19 proximate a rear of the vehicle. A crossbeam 22 may be tubular or non-tubular, and laterally extends across the vehicle from the first longitudinal frame member 16 to the second longitudinal frame member 18. The term "tubular" generally conveys the hollow nature of the cross-member 22, whereas the term "non-tubular" generally conveys a solid nature of the cross-member 22 across its cross-section. The cross-beam support member 22 may be made from any rigid and unbending material, including carbon-fiber, metallic, polymeric materials, and/or other similar suitable materials, for example. To further illustrate, the cross-beam support member 22 may be formed from aluminum or steel extrusions, or alloys thereof or made from a rigid polymeric material(s). The frame members may be made as known in the art. The cross-beam support member 22 is preferably formed in a rigid tubular shape, whereby areas of readily-occurring mechanical deformation are specifically avoided in accordance with the present invention. Stated another way, unlike other cross-beam support members typically used in the automotive industry (referenced below as cross members 40 and 42, for example), the cross-beam support 22 does not exhibit or contain areas that will readily collapse upon an axial force being asserted against the cross-beam support 22, the force directed along an axis "A" of the support 22. A periphery 24 is defined by the exterior of the cross-beam support 22 whereby the cross-beam support 22 is fixed to the left and right longitudinal frame members 16 and 18.

Figure 3:
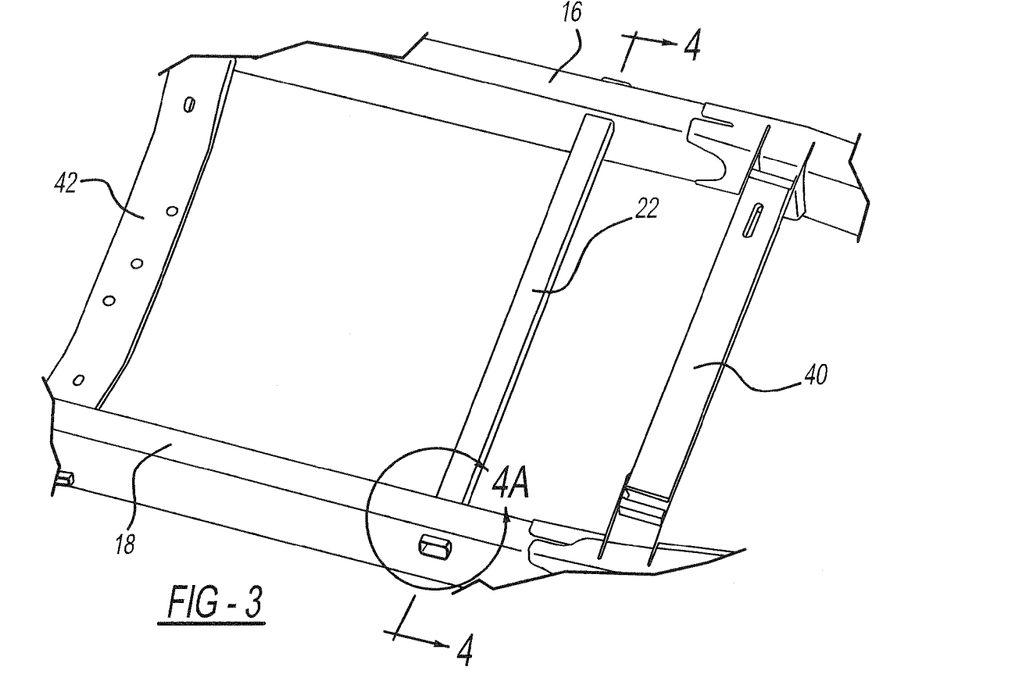
FIG. 3 is a perspective view of one embodiment of a pole impact protection system of the present invention, wherein an area of the interface between the cross member support and frame members, identified by line 4-4, is emphasized.
Figure 4:
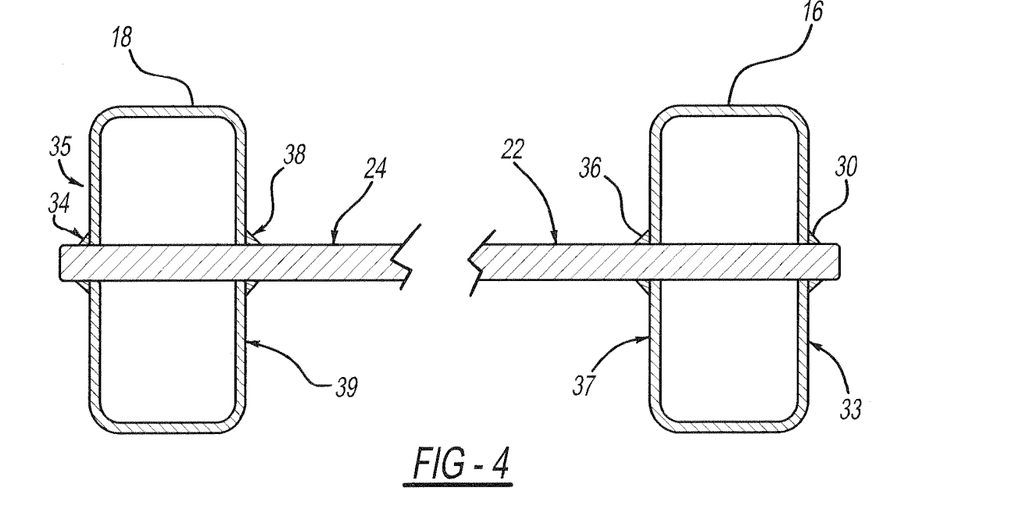
FIG. 4 is a view taken along the line 4-4 of FIG. 3, illustrating the interface between the cross member support and the frame members, in accordance with the present invention, wherein the cross member support is fixed to the longitudinal frame members at respective inner and outer regions of each longitudinal frame member.
Figure 4A:
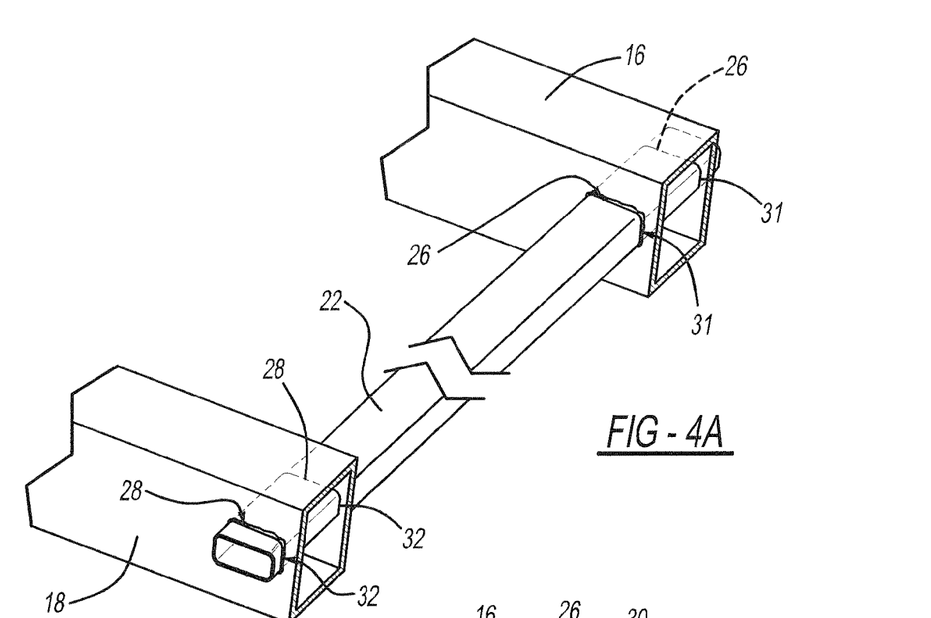
FIG. 4A is an exploded view of the inner and outer regions of a cross member support interfacing with the frame member(s).
Figure 5:
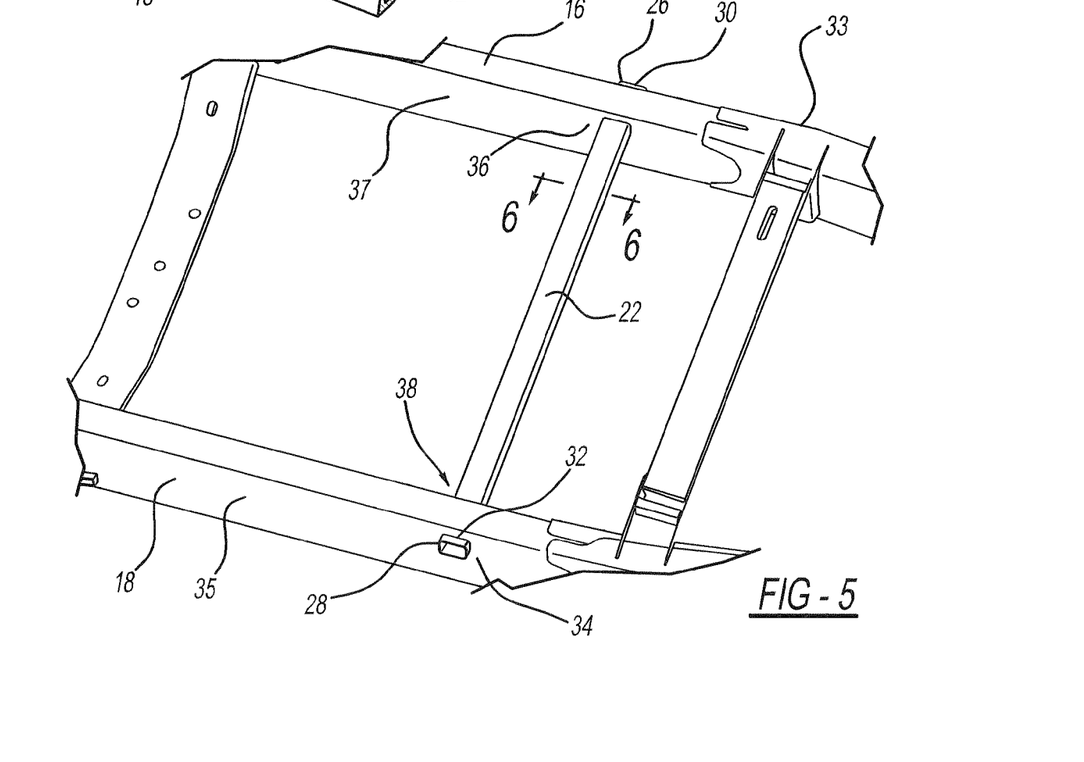
FIG. 5 is a perspective view of one embodiment of a pole impact protection system of the present invention, wherein a cross-section of the cross-member support taken along the line 6-6 is identified.
Figure 13:
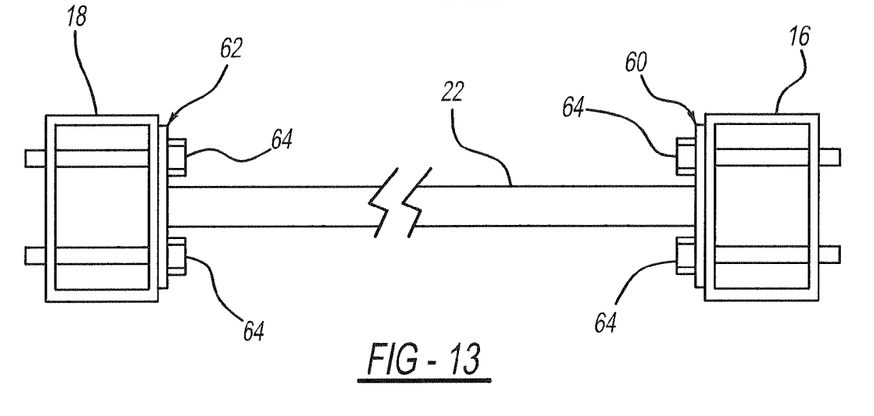
FIG. 13 is yet another embodiment illustrating an alternative method of fixing the cross member support to the longitudinal frame members.

As shown in FIGS. 3, 4, and 4A, at least one cavity 26 or a first pair of cavities 26 nay be formed in and through the first longitudinal frame member 16 for passage of the cross-beam support 22 therethrough. In the same way, at least one cavity 28 or a second pair of cavities 28 may be formed in and through the second longitudinal frame member 18 for passage of the cross-beam support 22 therethrough. As also shown in FIGS. 4 and 13, the cross-beam support 22 may be welded or otherwise fixed, e.g. fastened by nuts 23 and bolts 25, or by some other fastener such as rivets, to the first and second longitudinal members 16 and 18. A first outer junction 30 may be located proximate to an outer side surface 33 of the longitudinal member 16, and may be defined by the juncture of the periphery 24 and an inner cavity wall 31 proximate to the first cavities 26. A second outer junction 34 may be located proximate to an outer side surface 35 of the second longitudinal member 18, and may be defined by the juncture of the periphery 24 and an inner cavity wall 32 proximate to the second cavities 28. As shown in the FIG. 4 for example, the cross-beam 22 may be welded about at least a portion of the periphery 24 at the first outer junction 30 thereby providing a strong and enhanced union between the beam 22 and the first longitudinal member 16. Further, the cross-beam 22 may also be welded about at least a portion of the periphery 24 at the second outer junction 34 thereby providing a strong and enhanced union between the beam 22 and the second longitudinal member 18. In a more preferred embodiment, the cross-beam 22 may be completely welded about its periphery 24 at each outer junction 30 and 34.

Even further, if desired, a first inner junction 36 may be located proximate to an inner side surface 37 of the first longitudinal member 16, and may be defined by the juncture of the periphery 24 and an inner cavity wall 32 proximate to the first cavity 26. A second inner junction 38 may also be located proximate to an inner side surface 39 of the second longitudinal member 18, and may be defined by the juncture of the periphery 24 and an inner cavity wall 32 proximate to the second cavity 28. As shown in FIG. 4, the cross-beam 22 may be welded about at least a portion of the periphery 24 at the first inner junction 36 thereby providing a strong and enhanced union between the beam 22 and the first longitudinal member 16. Further, the cross-beam 22 may also be welded about at least a portion of the periphery 24 at the second inner junction 38 thereby providing a strong and enhanced union between the beam 22 and the second longitudinal member 18. In a more preferred embodiment, and as shown FIG. 4, the cross-beam 22 may be completely welded about its periphery 24 at each outer junction 30 and 34, and/or at each inner junction 36 and 38.

It has been found that welding or otherwise fixing the cross-beam 22 to the first and second longitudinal members 16 and 18 as described above enhances the ability to transfer the energy from a side pole impact event, from one side of the vehicle to the other while mitigating the mechanical damage to the body and/or interior of the vehicle. Passenger safety is thereby substantially enhanced while yet facilitating the ability to reduce the weight of the vehicle by minimizing the support structures needed to prevent injury to the passenger. As such, National Highway Traffic Safety Administration (NHTSA) regulations can be accommodated while also reconciling the need to provide fuel-efficient, relatively lower-weight vehicles. As shown in FIG. 2, the frame members 16 and 18 may also be fixed to other cross-members that may include a transmission support 40 and a drive shaft cross member support 42, for example. Unlike the cross-beam support 22, the support members 40 and 42 are not built to provide a lateral energy transfer from one side of the vehicle to the other, or from one longitudinal frame member to the other. Instead, the support members 40 and 42 may respectively support a transmission (not shown) and a drive shaft (not shown). Unlike the cross members 40 and 42, it will be appreciated that the rigid and unbending structure of the cross-member support 22 mitigates and may prevent the collapse of the cross-member support 22 along any lateral cross-section along its length. A distance "Y" extends rearwardly at the bottom of the vehicle 10, from the transmission support member 40 to the drive shaft cross member support 42. The distance "Y" may differ when considered for various body-on-frame vehicles, and basically defines the lateral points at which the cross-beam support 22 may be attached to each frame member 16 and 18, or the "sweet point zone". Furthermore, it will be appreciated that as the cross-beam 22 is fixed to the longitudinal frame members 16 and 18, it may be substantially orthogonally fixed to each frame member, thereby providing a rigid and unbendable cross-beam support for energy transfer there-across.

In yet another aspect of the invention, a cross-section 44 of the cross-beam support 22 may be rectangular and tubular in shape. Furthermore, one or more extensions 46 contained within an interior 48 and fixed to an inner wall 50 of the cross-beam 22, may extend from one side of the support 22 to a second side of the support 22, thereby further strengthening the rigid support member 22 to prevent collapse upon pole impact. Accordingly, the cross-sectional design enhances the mechanical energy transfer from longitudinal frame member 16 or 18 to the other longitudinal frame member 16 or 18. As also shown in the FIGURES, the extruded extensions 46 may be connected to each other in a myriad of ways.

Figure 6:
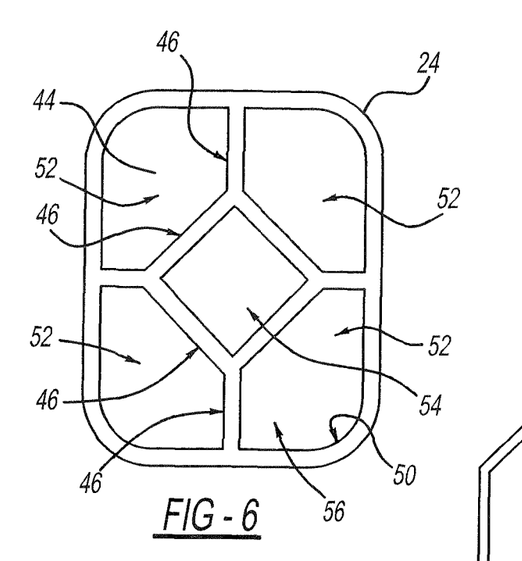
FIG. 6 is one multi-cell embodiment illustrating one potential cross-section of the cross member support, in accordance with the present invention, wherein four longitudinal cells surround a center longitudinal cell, and a rectangular periphery of the cross member support is shown.
Figure 7:
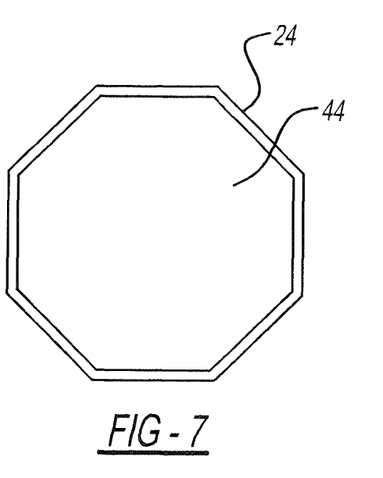
FIG. 7 is one single-cell embodiment illustrating one potential cross-section of the cross member support, in accordance with the present invention, wherein an octagonal periphery of the cross member support is shown.
Figure 8:
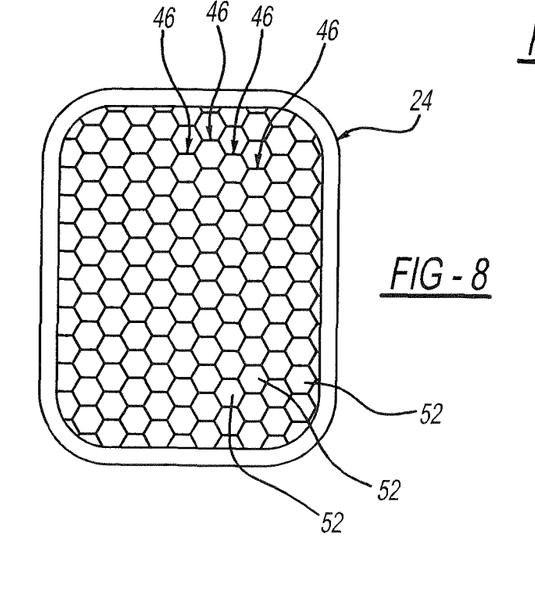
FIG. 8 is one multi-cell embodiment illustrating a honeycombed multi-cell configuration.
Figure 9:
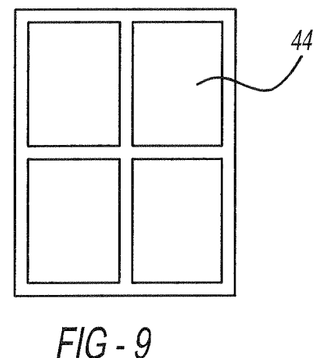
FIG. 9 is yet another multi-cell embodiment illustrating one potential cross-section of the cross member support, in accordance with the present invention, wherein four longitudinal cells are shown with a rectangular periphery.
Figure 10:
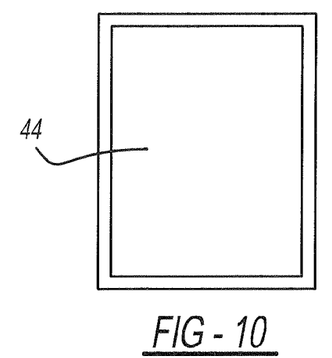
FIG. 10 is one single-cell embodiment illustrating one potential cross-section of the cross member support, in accordance with the present invention, wherein a rectangular periphery is shown.

FIG. 6 illustrates one embodiment and a cross-section 44 exhibiting four quadrants or cells 52 defined by extensions 46 directed to the center of the cross-section 44. Each quadrant (cell) 52 may be defined by extensions 46 that extend across the length of the beam 22. Each quadrant 52 extends radially inwardly toward an inner tube 54 also extending for most or all of the length of the beam 22. The cross-beam support or tube 22 may therefore be defined as being "reinforced" by extensions 46 extending along an interior 56 of the tube 22 and physically communicating with the inner wall 50 of the beam 22. The extensions 46 therefore define a plurality of cells 52 contained within the cross-beam support 22. Various multi-cell configurations/extrusions may present a two-cell cross-section or configuration, a four-cell or "window-like" cross-section or configuration, or a honey-combed cross-section. Other cross-sectional shapes 44 of cross-beam 22 including octagonal and rectangular shapes, and other "reinforcement" configurations are contemplated such as those shown in FIGS. 6-11. As shown in FIGS. 6-11, single-cell and multi-cell extrusions may be formed in accordance with the present invention, and in accordance with metal working methods well known in the art.

Figure 11:
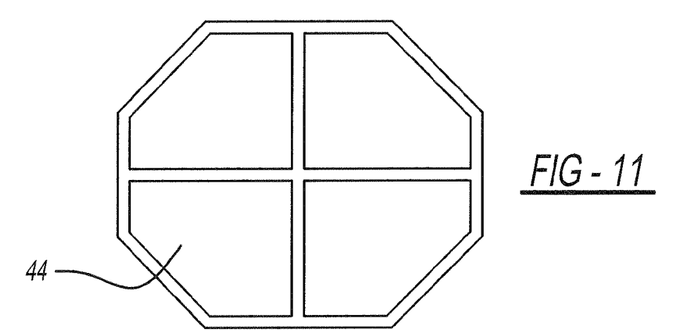
FIG. 11 is yet another multi-cell embodiment illustrating one potential cross-section of the cross member support, in accordance with the present invention, wherein four longitudinal cells are shown with an octagonal periphery.
Figure 12:
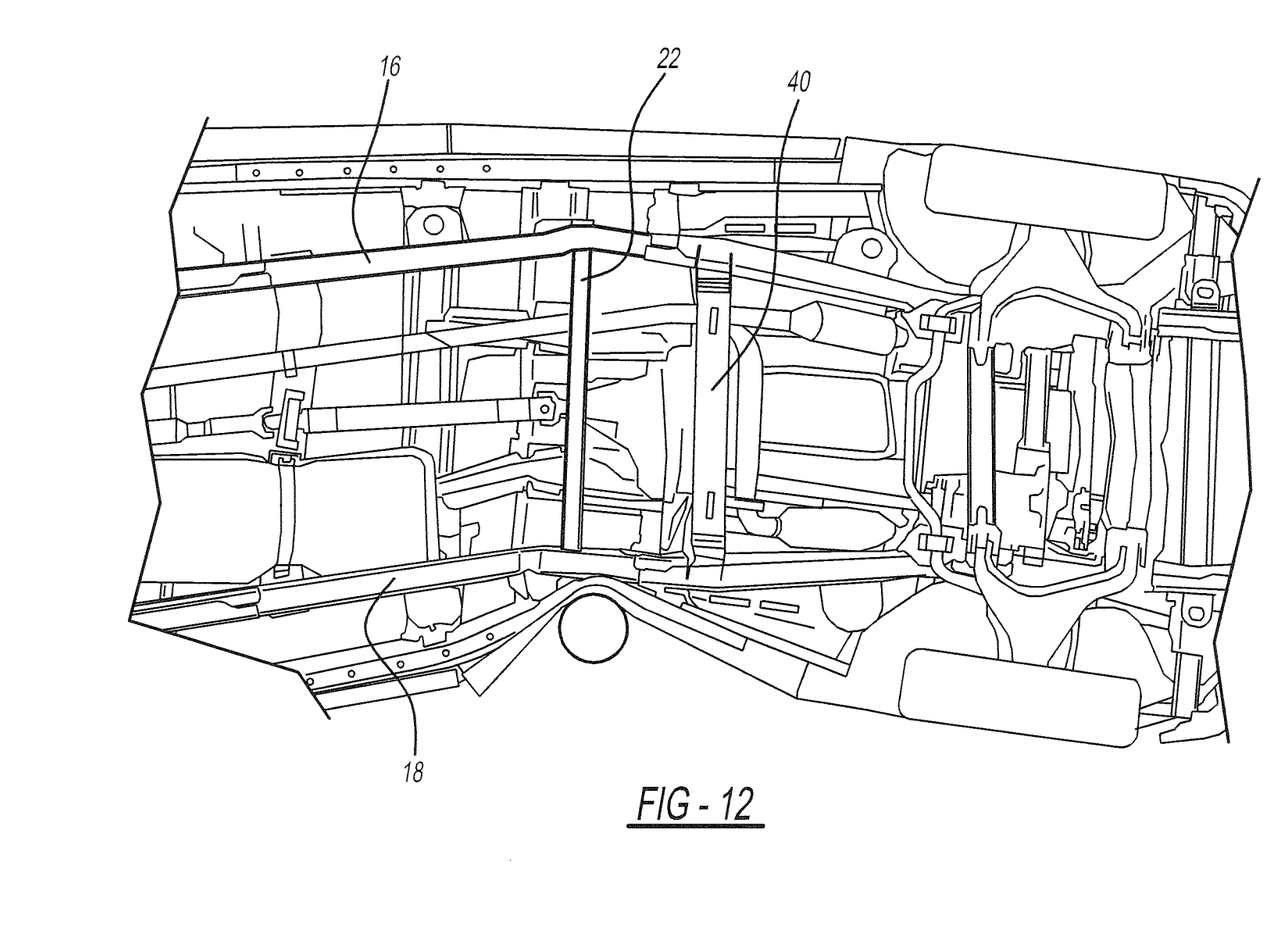
FIG. 12 is a bottom view of the pole impact protection system as shown in FIG. 1, after impact of a pole. As shown, energy from the impact along one frame member has been transferred to an opposite frame member.

In yet another aspect of the invention, and as shown in FIG. 13, the cross-beam support 22 may be connected or fixed to the longitudinal frame members 16 and 18 by bolting the cross-beam support 22 to the frame members 16 and 18. As shown in FIG. 13, the cross-beam support 22 contains a first bolting plate 60 and a second bolting plate 62 for fixing the cross-beam support 22 to the frame members 16 and 18. As also shown in FIG. 113, each bolting plate has at least one bolt 64 or at least one fastener 64 such as a rivet extending therethrough, and more preferably at least two bolts 64 that secure the cross-beam support 22 to the frame 14, in a substantial orthogonal relationship to the frame members 16 and 18. Again, the rigid, strong, and unbendable nature of the cross-beam 22 enhances the energy transfer across the beam 22 upon impact with a pole or other object. As shown in FIG. 11, the pole impact along the "sweet point zone" of one frame member results in mechanical deformation across both longitudinal frame members 16 and 18, thereby minimizing the deformation occurring within the body of the vehicle. The "sweet point zone" may be identified as a median region defined along the length of the frame members. The median region may be calculated as being within a median portion of the frame members. More specifically, if desired, the "sweet point" of the connection regions 30 and 34 interfacing with the cross-beam support 22 may be found in a median region that extends from about 20% to 80% of the length of the frame members. Furthermore, the lightweight configuration of the present pole protection systems results in better fuel economy while still enhancing the strength and impact resistance of the body-on-frame vehicle.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. An impact protection system for a vehicle comprising:
   a frame having a first longitudinal member and a second longitudinal member;
   a tubular cross-member support laterally connecting said first and second longitudinal members, said cross-member support comprising a periphery defining a cross-section;
   a first laterally-outward connection region defined by an outer junction of said first longitudinal member and said cross member support extending therethrough, wherein said first connection region is fixed to at least a portion of said periphery; and
   a second laterally-outward connection region defined by an outer junction of said second longitudinal member and said cross member support extending therethrough, wherein said second connection region is fixed to at least a portion of said periphery.

2. The impact protection system of claim 1 further comprising:
   a third laterally-inward connection region defined by an inner junction of said first longitudinal member and said cross member support extending therethrough, wherein said third connection region is fixed to at least a portion of said periphery; and
   a fourth laterally-inward connection region defined by an inner junction of said second longitudinal member and said cross member support extending therethrough, wherein said fourth connection region is fixed to at least a portion of said periphery.

3. The impact protection system of claim 1 wherein said cross-member is a hollow tube defining a cross-section of the cross-member.

4. The impact protection system of claim 3 wherein said cross-section comprises at least one cross-sectional support extension.

5. The impact protection system of claim 4 wherein said cross-section comprises at least two cross-sectional support extensions dividing said cross section into four substantially equal quadrants.

6. The impact protection system of claim 3 wherein said cross-section is octagonal or rectangular.

7. The impact protection system of claim 4 wherein said cross-section is honeycombed.

8. The impact protection system of claim 1 wherein said tubular cross-member support is substantially orthogonal to said first and second longitudinal members.

9. The impact protection system of claim 1 wherein said tubular cross-member is welded about at least a portion of said periphery at said first connection region and about said periphery at said second connection region.

10. The impact protection system of claim 2 wherein said tubular cross-member is welded about at least a portion of said periphery at said first, second, third, and fourth connection regions.

11. The impact protection system of claim 10 wherein said tubular cross-member is completely welded about said periphery at said first, second, third, and fourth connection regions.

12. An impact protection system for a vehicle comprising:
    a frame having a length defined by a forward lateral position proximate a front of the vehicle and an aft lateral position proximate a rear of the vehicle, said frame further comprising a first longitudinal member and a second longitudinal member; and
    a rigid and unbendable cross-member support laterally fixed to said first and second longitudinal members, wherein said rigid cross-member support is positioned within 20-80% of the length of the flame as it extends rearwardly from said forward lateral position.

13. The impact protection system of claim 12 wherein said cross-member support is tubular and further comprises a cross-section.

14. The impact protection system of claim 12 further comprising:
- a first plate at a first end of said cross member support;
- a second plate at a second end of said cross-member support;
- at least one first fastener extending through said first plate and fixing said cross-member support to said first longitudinal member; and
- at least one second fastener extending through said second plate and fixing said cross-member support to said second longitudinal member.

15. The impact protection system of claim 13 wherein said cross-section further comprises one or more transverse support extensions within said tubular cross member support.

16. The impact protection system of claim 15 wherein said cross-section containing one or more transverse support extensions defines two or more partitioned areas extending across the length of the tubular cross-member.

17. The impact protection system of claim 13 wherein said cross-section is octagonal or rectangular in shape.

18. The impact protection system of claim 16 wherein said tubular cross-member is divided into four longitudinal quadrants, or, into a plurality of longitudinal quadrants defining a honeycombed cross-section.

19. The impact protection system of claim 12 wherein said rigid cross-member support is positioned within 20-60% of the length of the frame as it extends rearwardly from said forward lateral position.

20. An impact protection system for a vehicle comprising:
- a frame having a length defined by a forward lateral position proximate a front of the vehicle and an aft lateral position proximate a rear of the vehicle, said frame further comprising a first longitudinal member and a second longitudinal member; and
- a rigid and unbendable cross-member support laterally and directly fixed to said first and second longitudinal members, said cross-member support extending through and welded to each of said first and second longitudinal members.

* * * * *